UNITED STATES PATENT OFFICE.

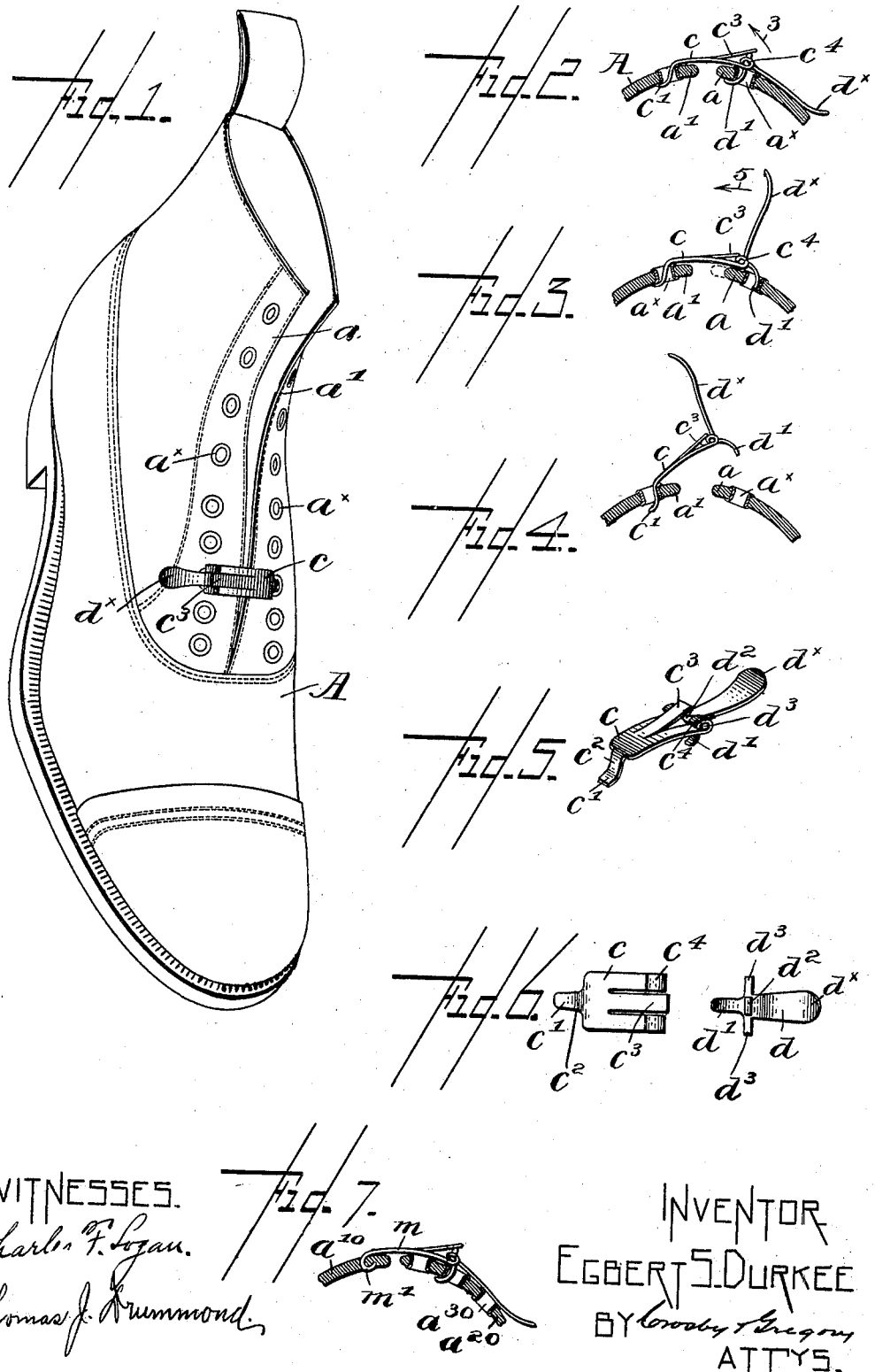

EGBERT S. DURKEE, OF BOSTON, MASSACHUSETTS, ASSIGNOR TO THE VICTORIA SELF LACING COMPANY, OF SAME PLACE.

FASTENER FOR USE IN LASTING SHOES.

SPECIFICATION forming part of Letters Patent No. 628,777, dated July 11, 1899.

Application filed February 6, 1899. Serial No. 704,613. (No model.)

*To all whom it may concern:*

Be it known that I, EGBERT S. DURKEE, of Boston, county of Suffolk, State of Massachusetts, have invented an Improvement in Fasteners, of which the following description, in connection with the accompanying drawings, is a specification, like letters on the drawings representing like parts.

This invention relates to fasteners more particularly adapted for use in holding together the fly members or top portions of shoes wherein the flies or top portions are provided with eyelets or lacing-openings, the construction and arrangement of the fastener embodying my invention being such that the fastener can be readily locked or released.

In the manufacture of shoes various means have been employed for holding the flies of the upper together to retain the upper in place on the last during the various operations connected with lasting, and my novel fastener is well adapted for use in such connection inasmuch as it is readily applied or removed and when in operative position cannot be accidentally displaced.

Figure 1 is a perspective view of a shoe-upper with a fastener applied thereto embodying one form of my invention. Fig. 2 is a side elevation, enlarged, of the fastener shown in Fig. 1, the fastener being shown in operative position on the flies of a shoe-upper. Fig. 3 is a similar view, but showing the relative position of the parts of the fastener when unlocked and ready to be locked or altogether removed from the shoe. Fig. 4 is a like view, but showing the fastener as just about to be removed. Fig. 5 is a perspective view of the fastener detached. Fig. 6, in plan view, shows the two members of the fastener as separated one from the other; and Fig. 7 is a sectional detail of a slightly-modified form of my fastener shown as permanently secured to the shoe.

Referring to Fig. 1, a shoe-upper A is shown with its top portions or flies $a$ $a'$ herein illustrated as provided with eyelets or lacing-openings $a^\times$ of any usual or well-known construction, the said flies or top portions being held together by one of my novel fasteners.

Referring to the construction shown in Figs. 1 to 6, inclusive, the fastener comprises, essentially, two members $c$ $d$, preferably made of sheet metal and stamped out or struck up into shape, the part $c$, hereinafter designated as the "anchor" member, having projecting longitudinally from one end a prong $c'$, slightly bent transversely, as at $c^2$, to form a shoulder, so that the outer end or tip of the prong is offset from the under side of the member $c$. The anchor member is longitudinally slotted to form a central elastic or spring finger $c^3$, while the outer portions are bent over to form loops or eyes $c^4$. The prong $c'$ is of such shape and dimensions as to readily enter an eyelet or opening $a^\times$ in the fly, (see Fig. 2,) the member $c$ and the tip of the prong bearing against the outer and inner sides of the fly or top portion, respectively, while the shoulder $c^2$ abuts against the edge of the opening $a^\times$, as clearly shown in Fig. 2, serving to anchor the member $c$ in place. The coöperating controlling, actuating, or locking member $d$ is herein shown as provided on its under side with a curved prong $d'$ and on its upper side with a cam-like projection $d^2$, said member being pivotally connected with the anchor member in any convenient manner, as herein shown, by lateral extensions or lugs $d^3$, which enter the eyes $c^4$. When said members are so connected, the spring-finger $c^3$ bears against the cam projection $d^2$, the tip of the prong $d'$ being turned inward toward the prong $c'$ of the anchor member. The main or body portion of the member $d$ is for convenience shaped to form an actuating-lever $d^\times$, by manipulation of which the fastener is operated, the free end of the spring-finger $c^3$ serving as a stop to limit the releasing or opening movement of the fastener members, as will be described. It will be undestood that the curved prong $d'$ is adapted to enter one of the lacing-openings $a^\times$.

In applying the fastener, the parts thereof being in the relative positions shown in Fig. 4, the prong $c'$ is inserted into one of the holes $a^\times$ of the top portion $a'$, and then the fastener is turned down until the prong $d'$ enters the corresponding hole in the fly or top portion $a$, as in Fig. 3, and by depressing the lever $d^\times$ the member $d$ is rocked on its pivot into the position shown in Figs. 1 and 2. This rocking movement of said member $d$ carries the tip of the prong $d'$ rearwardly and then upward to bear firmly and lock against the inner side of the fly $a$, and the cam $d^2$ is moved past center, so that the spring-finger $c^3$ then exerts its force to maintain the prong $d'$ in such position with the fastener locked upon the work. It will be obvious from an inspection of Fig. 2 that when the fastener is so locked it cannot be accidentally removed or displaced, as by pressing the flies together or in any other way, so that it cannot be released except by a direct unlocking movement.

The locking of the fastener is of a twofold nature, for when both of the prongs are in engagement with the work the fastener is locked thereupon as a whole. Again, as the prong $d'$ when in locking position firmly holds the coöperating eyelet portion of the shoe between said prong and the member $d$ the fastener will be locked on the work even should the anchor-prong be detached from its eyelet portion of the shoe. The fastener can thus be detachably connected with a shoe during the various stages of its manufacture either with both prongs in engagement or with only the locking member connected with the eyelet portion, and if it be desired to use the fastener on a completed shoe the single locking action will serve to retain the fastener on the shoe when taken off by the wearer.

When the fastener is locked, the holding-prongs $c'$ $d'$ bear firmly against the inner sides of the respective flies to which they are attached, and the lever $d^\times$ rests closely upon the outer side of the fly or top portion of the upper, held there by the spring-finger $c^3$, and the locking of the fastener serves also to draw together the two sides of the upper.

The unlocking and removal of the fastener is effected by a single movement, the lever $d^\times$ being lifted by the operator in the direction of the arrow 3, Fig. 2, until it assumes the position shown in Fig. 3. The cam $d^2$ is thereby carried past dead-center, the prong $d'$ is swung outwardly into the position shown in Fig. 3, and the end of the finger $c^3$ then bears against the base of the lever $d^\times$ and serves as a stop to limit the further rotative movement of the member $d$. The parts having assumed the position shown in Fig. 3, continued pressure or movement of the lever $d^\times$ in the direction of arrow 5 will rock the fastener as a whole on the prong $c'$ as a fulcrum, withdrawing the prong $d'$ altogether from the hole in the fly $a$, as in Fig. 4, so that the prong $c'$ of the anchor member will of itself roll or pull out of the hole in the fly $a'$. The spring-finger $c^3$, acting upon the cam $d^2$ at one or the other side of dead-center, operates to maintain the fastener in unlocked position ready to apply to the work or locked, as the case may be.

In the modification shown in Fig. 7 the fastener is adapted for permanent attachment to and use with a shoe, the prong $m'$ of the anchor member $m$ being therein shown as driven through the top portion $a^{10}$ of the shoe and upset or clenched on its under side.

The coöperating controlling or locking member (shown in Fig. 7) is constructed as shown in Figs. 1 to 6 and needs no further description; but the top portion $a^{20}$ of the shoe may be provided with a plurality of eyelets or openings, as $a^{30}$, arranged at different distances from the edge, so that different points of engagement for the prong $d'$ are provided.

My invention is not restricted to the precise construction and arrangement herein shown, as the same may be modified or rearranged in various particulars without departing from the spirit and scope of my invention.

Having described my invention, what I claim, and desire to secure by Letters Patent, is—

1. A device of the class described, comprising two relatively-movable members having each an engaging prong, adapted to enter the material from the outer side thereof, and means to lock said members in operative position after they have been inserted in the material as described.

2. A device of the class described, comprising two relatively-movable members having each a bent prong turned in the same direction when in operative position, and adapted to enter the material from the outer side thereof, and means to lock said members in such position with the extremities of the prongs pressed against the under side of the object to which the device is attached.

3. A device of the class described, comprising an anchor member, to rest upon the outer side of the work, a relatively-movable, connected controlling member having a downturned holding-prong and bent at its connecting-point to form an actuating-lever, downward movement of said lever bringing the said holding-prong into engagement with the shoe, and means to lock said controlling member to the shoe.

4. A device of the class described, comprising an anchor member having an offset, L-shaped and longitudinally-extended holding-prong at one end to enter the material from the outer side thereof, a coöperating member pivoted to the other end of the anchor member, and provided with an actuating-lever, a hooked holding-prong adjacent its pivot, to enter the material from the outer side, and a locking-cam and a controlling-spring to coöperate with said cam.

5. A device of the class described, comprising an anchor member having an offset, longitudinally-extended holding-prong at one end, to enter the material from the outer side and bear against the inner side thereof, a coöperating controlling member pivoted at the other end of the anchor member and provided with a rearwardly-bent holding-prong, and a spring to retain said members locked in operative position with the prongs pressed against the inner side of the material.

6. A two-part fastener comprising an anchor member, a pivotally-connected coöperating member having an attached curved holding-prong, relative movement of said members into operative position turning the tip of the prong rearward and upward toward the under side of the anchor member, and locking means to retain said members in operative position, said means consisting of a spring integral with one member and a coöperating locking-cam integral with the other member.

In testimony whereof I have signed my name to this specification in the presence of two subscribing witnesses.

EGBERT S. DURKEE.

Witnesses:
JOHN C. EDWARDS,
AUGUSTA E. DEAN.